SIGNAL TRANSMISSION SYSTEM

Filed May 9, 1946

INVENTOR
J. E. SMITH
BY H. S. Grover
ATTORNEY

Patented Jan. 30, 1951 2,539,797

UNITED STATES PATENT OFFICE 2,539,797

SIGNAL TRANSMISSION SYSTEM

James Ernest Smith, Jackson Heights, N. Y., assignor to Radio Corporation of America, a corporation of Delaware Application May 9, 1946, Serial No. 668,448

4 Claims. (Cl. 178—6.6)

Figures 1, 2A, 2B, 3A, 3B, 4A, 4B, 4C, 5A, 5B, 5C, 5D, 5E, 6A, 6B, 6C, 6D:
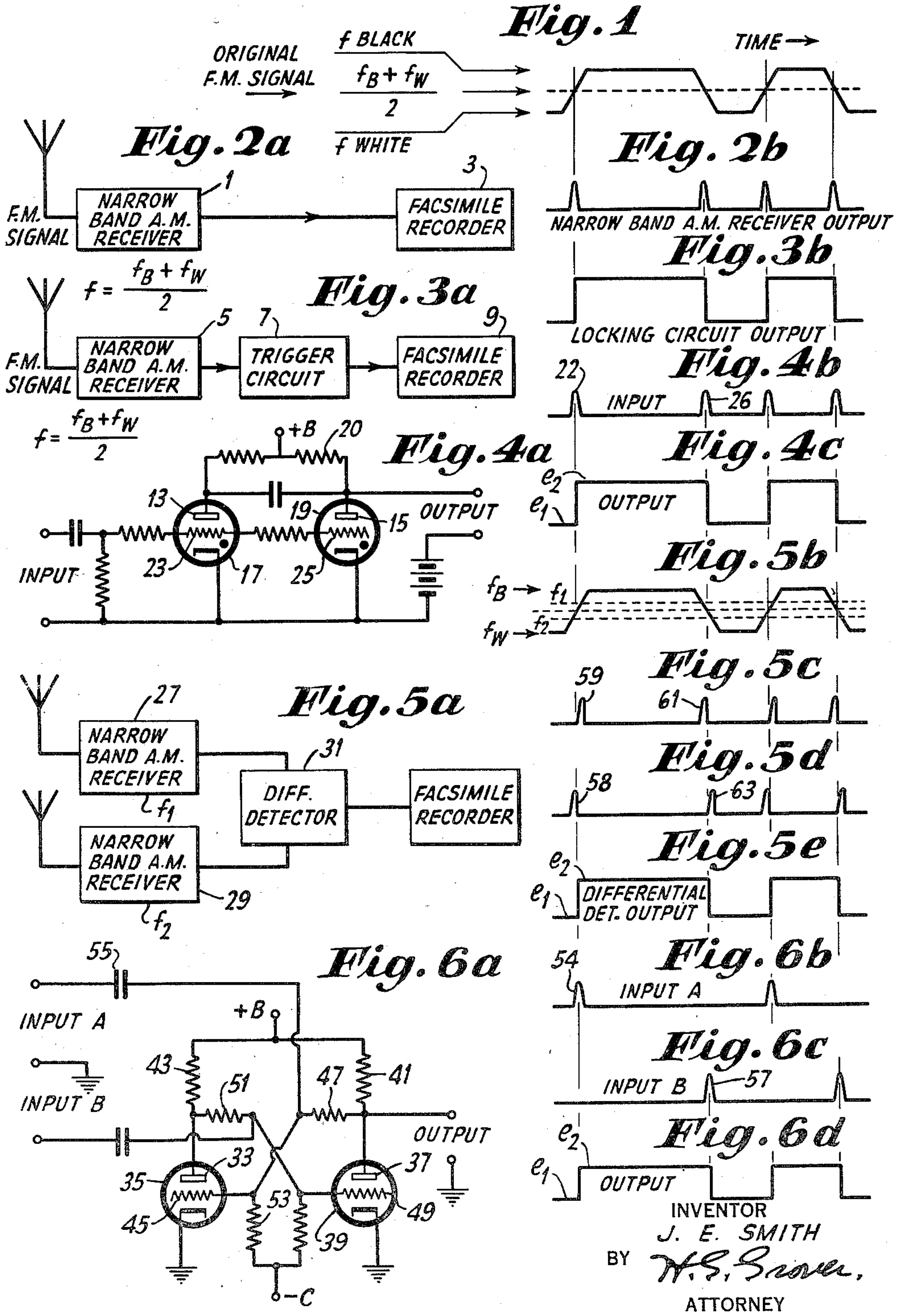

This invention relates to signal transmission systems and more particularly to a facsimile system which is less susceptible to interference than systems heretofore extensively utilized.

In frequency modulation systems as now customarily used, intelligence is superimposed upon a radio frequency carrier or subcarrier wave by varying the frequency of the wave (that is, frequency modulation or wavelength modulation) in accordance with the transmitted intelligence and maintaining the amplitude of the signal at a substantially constant value. Arbitrary limitations in extent of frequency change are chosen between which the signal varies. In one type of frequency modulation, intelligence having two specific characteristics is transmitted by utilizing one of the frequency limits for one intelligence characteristic, and the other frequency limit for the other intelligence characteristic.

Heretofore, if one or the other or both frequency limits were blocked by interference, intelligence could not satisfactorily be transmitted.

Although it is not the intention that this invention should be limited to the transmission of image signals, a form of this invention will be shown and described which is particularly adapted to facsimile signal transmission.

Facsimile is defined to include all systems whereby a picture is broken into separate picture elements, these elements being transmitted by some connecting means, such as a radio or wire line communication channel, to a distant recorder, where they are reassembled into their original positions to form a copy of the original. Three distinct operations are performed in the transmitting and recording of facsimile. First, the breaking up of the image or picture subject in some orderly manner into its separate elements to produce image or video signals for transmission, this process being called scanning; second, the transmitting of these produced signals to the recorder by means of suitable communication channels in which the transmitted signals are the electrical equivalent of these elements; and third, the rebuilding of these signals by a recorder through a reversal of the scanning process into a copy of the original, either as a directly produced copy or as a latent image from which the likeness of the original is developed.

In processing a picture, which will be a term herein used generically to represent any sort of subject from which the signals are developed by scanning in a facsimile system of the type shown and described in this invention, the image is resolved into dots, or elements which may be regarded as being black and white in the original subject. The black dot is represented by a predetermined limit frequency and the white dot is represented by a second predetermined limit frequency.

Aperture distortion caused by the scanning aperture being of finite size instead of infinitesimally small will make the signal representative of these dots trapezoidal or even triangular instead of square. If the aperture is exactly the width of the smallest dot, the signal representative of the dot becomes a triangle with a maximum value only at one point where the aperture is exactly covered by the dot. If the aperture is narrower than this, the signal representative of the dot becomes trapezoidal. In most systems, the aperture is made as narrow as is consistent with obtaining enough light to actuate the photo tube amplifier properly. It cannot be made infinitesimally small for, long before the spot of light becomes narrow enough to make the aperture distortion, the amount of amplification becomes so great that noises in the amplifying circuits become of the same order of magnitude as the signals to be amplified.

It will be seen that a change from a black to white element of an image will not result in an immediate change between the limit frequencies, but will result in the transmission of all frequencies intermediate the limit frequencies or a traverse from one limit frequency to the other. The present invention utilizes only that portion of the transmitted signal during the interval that the frequency changes from one frequency extreme to the other frequency extreme.

According to this invention, intelligence is transmitted by a frequency modulated signal which is of the type wherein the extremes of the signal frequency variations represent selected characteristics, and intelligence is resolved by the reception of the transmitted signal only during a portion of the traverse time between one limit of frequency and the other limit of frequency.

The primary object of this invention is to provide a new and improved signal transmission system.

Another object of this invention is to provide a new and improved signal transmission system which is less susceptible to interference.

Another object of this invention is to provide a signal transmission system which is less susceptible to fading.

Still another object of this invention is to provide an improved facsimile system which will transmit images that can be interpreted even through extreme interference.

Other and incidental objects of the invention will be apparent to those skilled in the art from a reading of the following specifications and an inspection of the accompanying drawing in which Figure 1 illustrates a typical frequency modulated signal of the type employed in the practice of this invention.

Figure 2$a$ illustrates in block diagram one form of this invention.

Figure 2$b$ shows a curve to accompany Figure 2$a$.

Figure 3$a$ illustrates in block diagram another form of this invention.

Figure 3$b$ shows a curve to accompany Figure 3$a$.

Figure 4$a$ illustrates in detail a triger circuit suitable for employment in the form of this invention illustrated in Figure 3$a$.

Figures 4$b$ and 4$c$ show curves to accompany Figure 4$a$.

Figure 5$a$ illustrates still another form of this invention.

Figures 5$b$, 5$c$, 5$d$, and 5$e$ show curves to accompany Figure 5$a$.

Figure 6$a$ illustrates by circuit diagram one form of differential detector which may be employed in a form of this invention as shown in Figure 5$a$.

Figures 6$b$, 6$c$, and 6$d$ show curves to accompany Figure 6$a$.

Referring now in more detail to Figure 1, suppose for the sake of illustration we consider a frequency modulated signal wherein $f_{white}$ is represented by one signal frequency and $f_{black}$ is represented by a second signal frequency. At each transition from the frequency representative of black to the frequency representative of white, or from frequency representative of white to the frequency representative of black, the transmitted signal traverses back and forth between $f_{white}$ and $f_{black}$ and passes through a signal frequency which is represented in Figure 1 as $$\frac{f_{black}+f_{white}}{2}$$

If a narrow band receiver sensitive to amplitude modulated signals is tuned to the frequency $$\frac{f_{black}+f_{white}}{2}$$

or any frequency between $f_{white}$ and $f_{black}$, a signal pulse will occur in the output of the receiver each time the signal frequency traverses the frequency to which the narrow band amplitude modulated receiver is tuned.

Figure 2$a$ illustrates in block diagram one form of this invention, wherein a narrow band amplitude modulated receiver 1 of any suitable form is tuned to a frequency intermediate the frequency limits of the incoming frequency modulated signal. The output, which will be in the form of a pulse each time the transmitted signal frequency passes through the frequency to which the receiver is tuned, is fed directly to a facsimile recorder 3, which may be of any type, as exemplified, for instance, by the Young Patent, No. 2,364,580, granted December 5, 1944.

Figure 2$b$ indicates the output signal of the narrow band amplitude modulated receiver 1 of Figure 2$a$ when receiving a signal such as that shown in Figure 1. It will be seen that the reproduced image will not be exactly the same as the transmitted image, but will take a form which can easily be interpreted by an operator with a little practice, whereas the signal would be unintelligible if one or the other or both of the frequency limits were blocked and a system in accordance with the prior art were employed.

Figure 3$a$ shows an amplitude modulated receiver 5 which is sensitive to a frequency intermediate the frequency extremes of the transmitted signal. The output of receiver 5, which is in the form of the pulses shown in Figure 2$b$, is fed into a trigger circuit 7. The trigger circuit may take the form of the Eccles-Jordan circuit shown and described on pages 171–176 of "Ultra High Frequency Techniques" by Brainerd, Koehler, Reich, and Woodruff, published by D. Van Nostrand Co., Inc., in 1942. The output signal of the trigger circuit 7 will take the form of a substantially square wave, which is shown in Figure 3$b$. It will be seen that if a signal such as indicated in Figure 3$b$ is fed to the facsimile recorder 9, which may be similar to the recorder 3, an image will result which is a substantial duplicate of the transmitted image.

Figure 4$a$ illustrates another type of a trigger circuit which can be employed in the form of this invention shown in Figure 3$a$.

The modified trigger circuit is a relaxation oscillator which may assume several different forms, depending upon the function it is required to perform. Trigger circuits may be designed as continuous or free running or as driven oscillators whose operation and frequency are controlled by a synchronizing or trigger voltage applied from an outside source. It has a wide frequency range. The form of trigger circuit shown in Figure 4$a$ is not an oscillator in the true sense; rather, is a circuit possessing two conditions of stable equilibrium. One condition is when one tube is conducting and the other cut off, and the other condition is when the other tube is conducting and the first tube cut off. The circuit remains in either one or the other of these two conditions, with no change in anode, control electrode, or cathode potential or anode current until action occurs which causes the non-conducting tube to conduct. The tubes then reverse their functions and remain in the new condition as long as no plate current flows in the cut-off tube. Because of this sudden reversal or "flopping" from one state of equilibrium to the other, this type of circuit is often referred to as "flip-flop" circuit.

To analyze further the operation of the circuit shown in Figure 4$a$, assume that the anode voltage B+ is suddenly applied to the anodes 13 and 15 of tubes 17 and 19, respectively. If both tubes and their corresponding circuit elements were exactly alike, equal currents would flow through the anode circuits. It is inconceivable, however, that two tubes and their circuit elements could be balanced so exactly as to permit this to occur. One tube will start to conduct an instant before the other. Assume for the purpose of explanation of this invention that tube 19 flashes sooner than tube 17. When conduction begins, tube 19 in drawing current will produce a voltage drop across anode resistor 20. The result is an output voltage which is indicated in Figure 4$c$ as $e_1$. The drop in potential of anode 15 of tube 19 is carried to anode 13 of tube 17 by capacity 21. This corresponding drop in potential of anode 13 will prevent tube 17 from firing.

In this condition, the circuit is in stable equilibrium with tube 17 at cut-off and tube 19 conducting. The circuit will remain in this condition until the non-conducting tube 17 is made to conduct by the application of a trigger voltage. A positive pulse, such as that shown by 22 in Figure 4$b$, may be injected into the input of the circuit shown in Figure 4$a$. This pulse is of the type obtained from the narrow band amplitude modulated receiver 5 shown in Figure 3$a$. When the positive pulse is applied to the control electrodes 23 and 25 of tubes 17 and 19 respectively, the positive pulse will have no effect on tube 19 because the control electrode 25 has lost control of tube 19, due to the fact that where a gaseous discharge tube is already conducting, a change in control electrode potential will have no effect on the electron flow in the tube. The positive pulse applied to control electrode 23 of tube 17 will, however, fire tube 17.

The instant tube 17 fires, there will be a drop in the potential of its anode 13, which drop in potential will be transferred to anode 15 of tube 19 through condenser 21. The drop in anode potential of tube 19 will cause it to be extinguished and there will follow a reduction in the potential drop across resistor 20, thus providing an increased output potential, which is represented by $e_2$ in Figure 4*c*. Upon the application of the next pulse 26 of Figure 4*b* to the control electrodes 23 and 25, the pulse will have no effect upon tube 17 because it is conducting current. The pulse, however, flashes tube 19. The flashing of tube 19 extinguishes tube 17, as explained above, and thus causes a return of the output potential to $e_1$.

Figure 5*a* illustrates another form of this invention wherein two narrow band amplitude modulated receivers 27 and 29 are both tuned to a frequency intermediate the limits of the transmitted frequency modulated signal and differing from each other such that two pulses are fed to the differential detector 31 with each traverse of the signal.

Figure 6*a* illustrates one form of differential detector which may be employed in the practice of the form of invention shown in Figure 5*a*. It is another form of trigger circuit and operates in a manner similar to the trigger circuit described above.

The form of trigger circuit shown in Figure 6*a* employs direct coupling between the anodes and control electrodes of the two tubes. It also possesses two conditions of stable equilibrium. One condition is when one tube is conducting and the other is at cut-off. The circuit remains in either one or the other of these two conditions, with no change in anode, control electrode or cathode potential or anode current until action occurs which causes the non-conducting tube to conduct. In order to cause the tubes to reverse their function, it is necessary to apply the pulse to the proper input circuit. The tubes then reverse their functions and remain in the new condition as long as no plate current flows in the cut-off tube.

To analyze in detail the operation of the circuit shown in Figure 6*a*, assume that the voltage B+ is suddenly applied to the anode 33 of tube 35 and anode 37 of tube 39. As explained above, if both tubes and their corresponding circuit elements were exactly alike, equal currents would flow through the anode circuits. This does not occur in practice. One tube will start to conduct an instant before the other, or will conduct more heavily than the other. Assume for the purpose of explanation of this invention that tube 39 conducts more heavily than tube 35.

When conduction begins, tube 39 is assumed to be passing a larger current than tube 35, so that the voltage drop across anode resistor 41 is greater than that across the anode resistor 43 of tube 35. The result is an output voltage which is indicated in Figure 6*d* as $e_1$. The lower voltage at anode 37 of tube 39 causes a lower voltage on the control electrode 45 of tube 35 because of the coupling resistor 47. The current through tube 35 is still further decreased because of this negative change of its control electrode potential. The decrease in anode current causes an increase in potential at the anode 33 of tube 35. This increase in potential is passed to the control electrode 49 of tube 39 through the coupling resistor 51. As a result of this positive going change in the control electrode voltage of tube 39, still more current flows in its anode circuit and the voltage in the anode 37 is still further decreased. This action is cumulative, so that when the magnitude of the voltage across tube 39 is considerably less than negative bias —C, the voltage across resistor 53 is sufficiently negative to cut off tube 35.

In this condition the circuit is in stable equilibrium, with tube 35 at cut-off and tube 39 conducting heavily. The circuit will remain in this condition until the non-conducting tube 35 is made to conduct by the application of a trigger voltage. A positive pulse 54 such as that shown in Figure 6*b* may be injected in the input A. It will be applied to control electrode 45 through the capacity 55. When a positive pulse is applied to the control electrode 45 of the tube 35, it will remove the highly negative potential on the control electrode 45 of tube 35 momentarily. Current then flows in the anode circuit of tube 35 and the voltage at its anode 33 drops. This decrease in potential is impressed on the control electrode 49 of tube 39. The current through the anode resistor 41 then decreases and the potential of anode 37 rises. This rise in potential is passed on to the control electrode 45 of tube 35, causing a still further increase in its anode current. This action continues until tube 35 is conducting a heavy current and tube 39 is cut off. When the tube 39 is cut off, its anode potential is high, thus resulting in the output voltage illustrated in Figure 6*d* as $e_2$.

If another positive pulse is received at input A, it will be seen that no change in the stable equilibrium of the circuit will result. A positive pulse at input A will result in an increase in the positive potential on control electrode 45 of tube 35 which is already conducting its maximum current.

If, however, a positive pulse such as 57 of Figure 6*c* is inserted in input B, the control electrode 49 will go positive enough to cause a current flow in tube 39. If follows that a current flow in tube 39 will cause a voltage drop across resistor 41, which will result in a reduced potential on anode 37. The reduced potential on anode 37 will be transferred to control electrode 45 of tube 35 through resistor 47. The negative change in the potential on the control electrode 45 of tube 35 will cause a reduction in current flow in tube 35, which in turn will result in a corresponding increase in the potential of anode 33 of tube 35. This increase in anode potential of tube 35 will be transferred to control electrode 49 of tube 39 through resistor 51. The negative change on control electrode 49 will further reduce the current flow in tube 39 so that the anode potential 37 of tube 39 will drop back to a potential $e_1$, as indicated in Figure 6*d*. This cycle will repeat itself each time pulses are applied to the input circuits A and B in the proper order.

Referring again to Figure 5*a*, it will be seen that if the trigger circuit shown in Figure 6*a* is used as the differential detector 31 and the output of the receiver 27 is connected to input A of Figure 6*a* and receiver 29 is connected to input B of Figure 6*a*, a pulse arriving from receiver 27 will cause the output voltage of the differential detector to either remain at or go to potential $e_2$.

If a pulse arrives from receiver 29, the output potential of the differential detector 31 will go to a value represented by $e_1$ of Figure 5*e*.

It follows that if receiver 27 of Figure 5*a* is tuned to a frequency $f_1$ of Figure 5*b* and receiver 29 is tuned to a frequency $f_2$ both of which are intermediate the limit frequencies which are represented by $f_{white}$ and $f_{black}$, two pulses will occur during each traverse between $f_{white}$ and $f_{black}$. The order in which the pulses occur will be determined by the direction of the traverse. For example, if the traverse is in the direction of $f_{white}$ to $f_{black}$, the pulse 58 of Figure 5*d* will occur first from receiver 29 or at position input B of Figure 6*a*. If the condition of the trigger circuit is such that the output potential is already in value $e_1$, no change will occur in its output potential.

Upon the arrival of the second pulse which will arrive from receiver 27 and which is shown in Figure 5*c* as 59, a change will result in the condition of the trigger circuit shown in Figure 6*a*, and its output value will go to $e_2$, as explained in more detail above.

The condition of the circuit will remain stable through the next pulse 61 resulting from the next traverse of $f_1$ by the transmitted signal in returning from $f_{black}$ to $f_{white}$, the reason being that the last pulse 59 of Figure 5*c* arrived at input A of Figure 6*a* and no change in the circuit equilibrium will result until a pulse arrives at input B.

When, however, the transmitted signal traverses $f_2$ and results in pulse 63 of Figure 5*d* which is applied to input B of Figure 6*a*, a change in condition will result in the trigger circuit, and the output potential will return to $e_1$ and remain there until another pulse arrives at input A.

Having now described the invention, I claim:

1. A signal translating system arranged to respond to signals wherein all the translated intelligence is in the form of amplitude modulation of signal carriers positioned at predetermined limiting maximum and minimum frequency values and wherein the transmitted signal energy traverses the complete frequency range between the selected maximum and minimum frequency values between transmissions of different selected characteristics comprising two narrow band amplitude modulated receivers tuned to respond to each of two intermediate frequencies between the selected maximum and minimum frequencies and excluding the said maximum and minimum frequencies, a trigger circuit having an input circuit for each of two conditions of stable equilibrium, an input circuit of said trigger circuit connected to each of said narrow band amplitude modulated receivers, and means connected to the output of said trigger circuit to reconstruct the intelligence of said intelligence signals.

2. A signal translating system for a signalling system wherein all the transmitted intelligence is in the form of amplitude modulation of signal carriers positioned at predetermined limiting maximum and minimum frequency values and wherein the transmitted signal energy traverses the complete frequency range between the selected maximum and minimum frequency values between transmissions of different selected characteristics comprising a signal responsive circuit connected to respond to one frequency value in the range between the selected maximum and minimum frequencies and excluding the said maximum and minimum frequencies, and a signal translating means connected to receive output signals from the said circuit, including a trigger circuit having two conditions of stable equilibrium, which conditions will change from one to the other upon the application of a signal in the form of a pulse, an image recorder connected to said trigger circuit to produce therefrom observable signal indications.

3. In a signalling system wherein all the transmitted intelligence is represented by selected maximum and minimum frequency values only of a predetermined frequency range and wherein the transmitted signal traverses the complete frequency range between the selected maximum and minimum frequency values representative of different selected characteristics without interruption of transmitted energy, a signal circuit responsive only to a single frequency value in the range between the selected maximum and minimum frequencies and excluding the said maximum and minimum frequencies, a multivibrator circuit stable in each of two conditions, said multivibrator connected to said signal circuit to receive signals therefrom, and signal translating means connected to receive output signals from said multivibrator circuit and to produce intelligence therefrom.

4. A signal translating system to respond to signals wherein all the transmitted intelligence is in the form of amplitude modulation of signal carriers positioned at predetermined limiting, maximum, and minimum frequency values and wherein the transmitted signal energy traverses the complete frequency range between the selected maximum and minimum frequency values between each transmission of different selected characteristics, said signal translating system comprising in combination, signalling means responsive only to signals having frequencies lying between said maximum and said minimum frequency values and excluding said maximum and minimum frequency values, and means connected to said afore-mentioned signal responsive means responsive only to the direction of change in the frequency of said signal applied to said signalling responsive means.

JAMES ERNEST SMITH.

REFERENCES CITED

The following references are of record in the file of this patent:

UNITED STATES PATENTS

| Number | Name | Date |
|---|---|---|
| 1,844,950 | Finch | Feb. 16, 1932 |
| 2,001,747 | Runge | May 21, 1935 |
| 2,143,875 | Hansell | Jan. 17, 1939 |
| 2,176,949 | Artzt | Oct. 24, 1939 |
| 2,200,344 | Rudd | May 14, 1940 |
| 2,257,282 | Smith | Sept. 30, 1941 |
| 2,262,838 | Deloraine | Nov. 18, 1941 |
| 2,272,070 | Reeves | Feb. 3, 1942 |
| 2,277,261 | Smith | Mar. 24, 1942 |
| 2,306,386 | Hollywood | Dec. 29, 1942 |
| 2,384,379 | Ingram | Sept. 4, 1945 |
| 2,390,608 | Miller | Dec. 11, 1945 |

FOREIGN PATENTS

| Number | Country | Date |
|---|---|---|
| 557,563 | Great Britain | Nov. 25, 1943 |